United States Patent
Reinders et al.

(10) Patent No.: US 11,820,152 B2
(45) Date of Patent: Nov. 21, 2023

(54) METHOD AND ARRANGEMENT FOR CALIBRATING A DELIVERY RATE OF AN INK PUMP OF A PRINTING DEVICE

(71) Applicant: Canon Production Printing Holding B.V., Venlo (NL)

(72) Inventors: Jochen Reinders, Isen (DE); Florian Hitzlsperger, Poing (DE); Christoph Rummelsberger, Ismaning (DE)

(73) Assignee: Canon Production Printing Holding B.V., Venlo (NL)

( * ) Notice: Subject to any disclaimer, the term of this patent is extended or adjusted under 35 U.S.C. 154(b) by 99 days.

(21) Appl. No.: 17/717,965

(22) Filed: Apr. 11, 2022

(65) Prior Publication Data

US 2022/0324236 A1 Oct. 13, 2022

(30) Foreign Application Priority Data

Apr. 12, 2021 (DE) ...................... 10 2021 108 997.2

(51) Int. Cl.
*B41J 2/175* (2006.01)
*G06K 15/02* (2006.01)

(52) U.S. Cl.
CPC ....... *B41J 2/17566* (2013.01); *B41J 2/17596* (2013.01); *G06K 15/1823* (2013.01)

(58) Field of Classification Search
CPC .............. G06K 15/1823; B41J 2/17596; B41J 2/17566; B41J 2/175; B41J 2002/17579
See application file for complete search history.

(56) References Cited

U.S. PATENT DOCUMENTS

| 2008/0117240 | A1 | 5/2008 | Sheinman |
| 2018/0162136 | A1* | 6/2018 | Rietbergen ............. B41J 2/1752 |

FOREIGN PATENT DOCUMENTS

| DE | 102014106424 A1 | 11/2015 |
| DE | 102018100537 B3 | 7/2019 |
| EP | 3335884 A1 | 6/2018 |
| JP | 2010228350 A | 10/2010 |
| JP | 20181751 A | 1/2018 |
| WO | 2020040768 A1 | 2/2020 |
| WO | WO-2020040768 A1 * | 2/2020 |

OTHER PUBLICATIONS

Office Action issued in DE102021108997.2 dated Jan. 28, 2022.

* cited by examiner

*Primary Examiner* — An H Do
(74) *Attorney, Agent, or Firm* — THE WEBB LAW FIRM

(57) ABSTRACT

A method and an arrangement for calibrating a delivery rate of an ink pump of a printing device with the aid of an ink container including a sensor unit for detecting at least a first fill level value. Based on the initial fill level of the ink container below the first fill level value, the ink pump conveys ink from an ink reservoir into the ink container up to a final fill level above the first fill level value, so that at least a predetermined volume between the initial fill level and the first fill level value is filled. Upon conveying the ink into the ink container, an ink pump parameter is determined as of reaching the initial fill level and until the first fill level value is reached. A delivery rate of the ink pump is determined based on the predetermined volume and the ink pump parameter.

20 Claims, 3 Drawing Sheets

METHOD AND ARRANGEMENT FOR CALIBRATING A DELIVERY RATE OF AN INK PUMP OF A PRINTING DEVICE

CROSS-REFERENCE TO RELATED APPLICATION

This application claims priority to German Patent Application No. 10 2021 108 997.2 filed Apr. 12, 2021, the disclosure of which is hereby incorporated by reference in its entirety.

BACKGROUND

Field

The disclosure relates to a method and an arrangement for calibrating a delivery rate of an ink pump of a printing device with the aid of an ink container comprising a sensor unit for detecting at least one first fill level value of the ink in the ink container. The disclosure also relates to a method for determining an ink consumption parameter of at least one print head of a printing device, and a method for determining an anticipated ink consumption for a print image to be printed on the basis of print data.

Related Art

The significantly variable costs of an inkjet printing device, in particular of a high-capacity inkjet printing device, are determined by its ink consumption. In order to be able to determine costs of print jobs, an estimation of the actual ink consumption of a print job is necessary. This estimation is also necessary in order to stockpile sufficient ink for the ink consumption to be expected.

Known solutions determine an ink consumption with the aid of volumetric flow rate sensors in ink lines. Volumetric flow rate sensors have the disadvantage of the high costs of these sensors. Furthermore, such volumetric flow rate sensors are extremely imprecise in detecting the exact ink consumption, in particular given an intermittent, discontinuous flow as it occurs in the ink line of an inkjet printing device.

The document EP 3 335 884 A1 discloses an ink supply system having a counter that counts the printed ink droplets and, based on the number of printed ink droplets, determines a printed ink volume and a delivery rate of an ink pump.

SUMMARY

The disclosure is based on the object of specifying a method and an arrangement for calibrating a delivery rate of an ink pump of a printing device in which a precise calibration of the delivery rate is possible. A method for precisely determining at least one parameter for the ink consumption of at least one print head of a printing device is also specified. Moreover, a method is specified for determining an anticipated ink consumption depending on print data that yield [a] print image.

These objects are achieved via a method and arrangement for calibrating a delivery rate of an ink pump of a printing device as described herein.

A method for calibrating a delivery rate of an ink pump of a printing device with the aid of an ink container, according to a first aspect of the disclosure, having at least one sensor unit for detecting at least one fill level value, includes the following steps:

based on an initial fill level of the ink container below a first fill level value, the ink pump conveys ink from an ink reservoir into the ink container up to an end fill level that reaches at least the first fill level value, so that at least a predetermined volume between the initial fill level and the first fill level value is filled;

upon conveying the ink into the ink container, an ink pump parameter is detected upon reaching the first fill level value;

optionally, a second fill level value may be detected before the first fill level value;

a delivery rate of the ink pump is determined based on the predetermined volume and the ink pump parameter.

It is thereby achieved that the determined delivery rate is determined especially precisely, and in particular corresponds to an actual delivery rate of the ink pump.

A method for determining an ink consumption parameter of at least one print head of a printing device, according to a second aspect of the disclosure, includes the following steps:

the print head is supplied with ink from an ink containing having a sensor unit to detect at least one first fill level value;

a test print image is printed onto a recording medium with the aid of the print head; the test print image has at least one print image region that is dependent on a predetermined test print parameter;

before beginning the printing of the test print image, the ink container is filled with ink at least up to the first fill level value;

upon printing the test print image, ink is transported from the ink container to the print head, so that the fill level of the ink container falls to a consumed fill level below the first fill level value;

with the aid of an ink printing unit, ink is pumped from an ink reservoir into the ink container in order to fill the ink container from the consumed fill level in particular to the first fill level value, wherein an ink pump parameter is determined, upon conveying the ink into the ink container, until the first fill level value is reached;

an ink consumption parameter for the predetermined test print parameter is determined based on the ink pump parameter and a delivery rate of the ink pump.

In particular, the delivery rate determined by the method according to a first aspect of the disclosure may be used in this method. It is thereby achieved that the ink consumption parameter is determined especially precisely based on the actual delivery rate. It is thus also possible to calculate the future ink consumption for the printing device. Furthermore, this method according to the disclosure enables a precise calculation of the printing costs of individual print images. In particular, not only can average prices for multiple print images be determined, but rather individual page prices or prices for individual print images that are based on the actual ink consumption, whereby a simple determination of requirements and stockpiling are possible.

A method for determining an anticipated ink consumption for a print image to be printed based on print data, according to a third aspect of the disclosure, includes the following steps:

for raster regions of the print image, respective inking intensities for primary colors are determined from the print data;

the anticipated ink consumption for the print image to be printed is determined with the aid of ink consumption parameters and based on inking intensities.

In particular, the ink consumption parameter determined via the method according to a second aspect of the disclosure may be used for this method. It is thereby achieved that the determined anticipated ink consumption is determined based on the determined actual delivery rate and the actual ink consumption parameter. That enables an especially precise calculation of the anticipated ink consumption for the printing device. Furthermore, it enables a precise automatic calculation or automatic prediction of prices for the printing of print images. In particular, not only may average anticipated prices for multiple print images thus be determined; rather, anticipated actual, individual page prices or prices for individual, specific print images may be determined automatically.

An arrangement for calibrating a delivery rate of an ink pump of a printing device with the aid of an ink container having a sensor unit to detect at least one first fill level value has a control unit that is designed to control the ink pump, based on an initial fill level of the ink container below the first fill level value, such that ink is conveyed from an ink reservoir into the ink container up to a final fill level that at least reaches the first fill level value. It is therewith achieved that at least a predetermined volume between the initial fill level and the first fill level value is filled. It is noted that the initial fill level may also be zero. In such an instance, the ink container would then be empty.

Upon conveying the ink into the ink container, an ink pump parameter is detected upon reaching the first fill level value. A delivery rate of the ink pump is determined based on the predetermined volume and the ink pump parameter. It is thereby achieved that the determined delivery rate is determined especially precisely, and in particular corresponds to an actual delivery rate of the ink pump. Given the use of the second signal transmitter, the second (lower) fill level value is detected in advance of the first (higher) fill level value.

BRIEF DESCRIPTION OF THE DRAWINGS

Exemplary embodiments are described in the following using drawings. Shown are.

DETAILED DESCRIPTION

Figure 1:
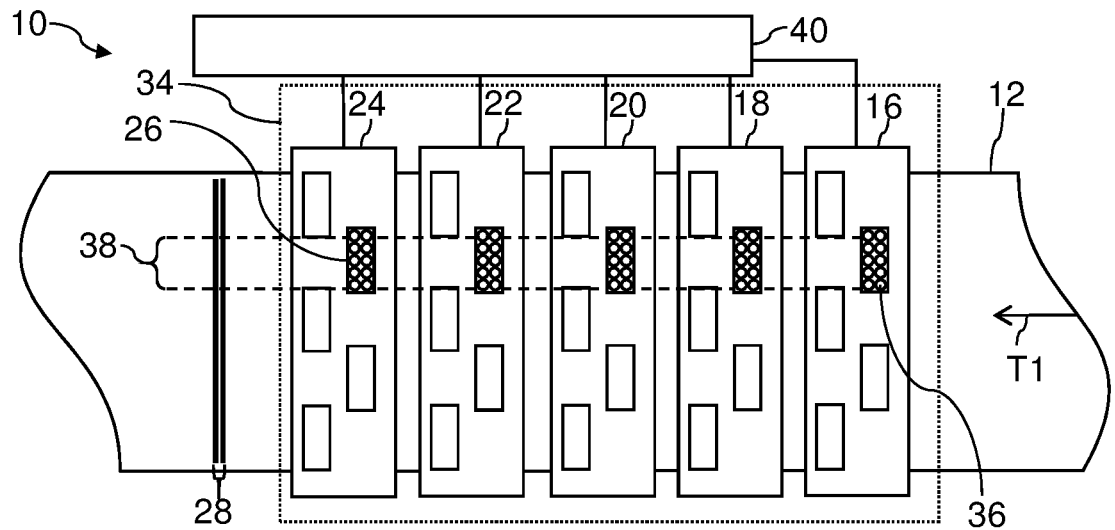
FIG. 1 is a schematic plan view of a printing device.

FIG. 1 shows a schematic plan view of a printing device 10 for printing to a recording medium 12 in the form of a web. In the exemplary embodiment, the printing device 10 is executed as a known inkjet printing device. Such a printing device is known from, for example, the document DE 10 2014 106 424 A1.

The printing device 10 has, per primary color, at least one print bar 18 to 24 having one or more depicted print heads 26 that are arranged transverse to a transport direction T1 of the continuously drivable recording medium 12, here in the form of a web. The recording medium 12 may be produced from paper, paperboard, cardboard, textile, a combination thereof, and/or other media that are suitable and can be printed to.

As an alternative to continuously supplied recording media 12 in the form of a web, individual sheets may also be supplied to the printing device 10.

The recording medium 12 is guided through the printing device 10 and is thereby directed, with the aid of a plurality of guide rollers, past the print bars 16 to 24 having the print heads 26, wherein the print heads 26 apply a print image 28 onto the recording medium 12 in the form of dots. In FIG. 1, the print image 28 is depicted by way of example as two parallel bars printed across the printable width of the recording medium 12.

The recording medium 12 is subsequently guided further to a drying (not shown), and if applicable to a subsequent additional printing device in which especially the back side of the recording medium 12 may then be printed to. Subsequently, or as an alternative to this, the recording medium 12 may be supplied to a post-processing in which the recording medium 12 is cut, folded, and/or end-processed in other work steps.

For a full-color printing, four base colors are typically used, such as cyan, magenta, yellow, and black (CMYK). Additional base colors, for example green, orange, or violet, may expand the color space of the printing device 10. Moreover, additional colors or special inks may be present, such as Magnetic Ink Character Recognition (MICR) ink. Each base color is printed with the print heads 26 of a single print bar 18 to 24 onto the recording medium 12. It is likewise possible that transparent special fluids, such as primer or drying promoter, are digitally applied, likewise with the aid of a separate print bar, before or after the printing of the print image 28, in order to improve the print quality or the adhesion of the ink on the recording medium 12. In the exemplary embodiment according to FIG. 1, a primer fluid is printed onto the recording medium 12 with the aid of the print bar 16. The primer fluid is thus applied onto the recording medium 12 before the printing of the print image 28.

The print bars 16 through 24 form a printing unit 34. Printing may be performed line by line with each of the print bars 16 through 24 of the printing device 10. For this purpose, each print bar 16 through 24 comprises a plurality of print heads 26 that are arranged next to one another in two rows, alternating sequentially.

In FIG. 1, each print bar 16 through 24 comprises five print heads 26 in order to apply the print image 28 in a plurality of columns 38 onto the recording medium 12. Each print head 26 comprises a plurality of print nozzles 36 (in FIG. 1, only ten print nozzles are shown for simplicity), wherein each print nozzle 36 may apply ink droplets of a variable volume onto the recording medium 12 in the form of dots. In practice, each print head 26 may comprise multiple hundreds to multiple thousands of print nozzles 36 directed toward the recording medium 12. The print nozzles 36 are arranged in a row transverse to the transport direction T1. With the aid of the print nozzles 36 of a print head 26, a print image 28 may be printed across a portion of a line along the printable width of the recording medium 12, and in the form of one of the columns 38 across the length of the recording medium 12 in the transport direction T1. A region of the recording medium 12 below the print head 26 is thereby printed to by each print head 26.

In other embodiments, each print head 26 has a plurality of rows of print nozzles 38. In this instance, a region having a plurality of lines is printed simultaneously onto the recording medium 12 below the print head 26.

Each dot along a line across the printable width of the recording medium 12 is printed by the corresponding print nozzles 36 of the print bar 18 to 24. The print resolution in the print line direction (transverse to the transport direction T1) is thus determined by the pitches or clearances, with respect to one another, of the dots printed by the print nozzles 36 onto the recording medium 12. By contrast, given individual print heads, the print resolution in the transport direction T1 is determined by the transport velocity of the recording medium 12 and the line timing of the print heads 18 through 24 given line-clocked printing. Given a plurality of print nozzle rows, the print resolution in the transport direction T1 is dependent on the pitch of the print nozzle rows with respect to one another.

Given the printing device 10 according to FIG. 1, the print heads 16 through 24 are arranged stationary. In other embodiments, the print heads 16 through 24 may also be arranged so as to be movable relative to the transport direction T1.

With the aid of a control unit 40, the individual print heads 26 of the print bars 18 through 24 are controlled, based on rastered print data, so that the individual ink droplets are applied at the position of the recording medium 12 defined by the print data. On the recording medium 12, the individual ink droplets form individual dots that, in their entirety, form the print image 28 on the recording medium 12.

The area coverage of the dots in a region of the recording medium 12 determines the inking intensity in this region. Given a complete inking of the recording medium 12 with its base color, the inking intensity is 100%. Given half-inking of the recording medium 12, the inking intensity is 50%. In the instance in which no inking of the recording medium 12 takes place in the region, the inking intensity is 0%.

Figure 2:
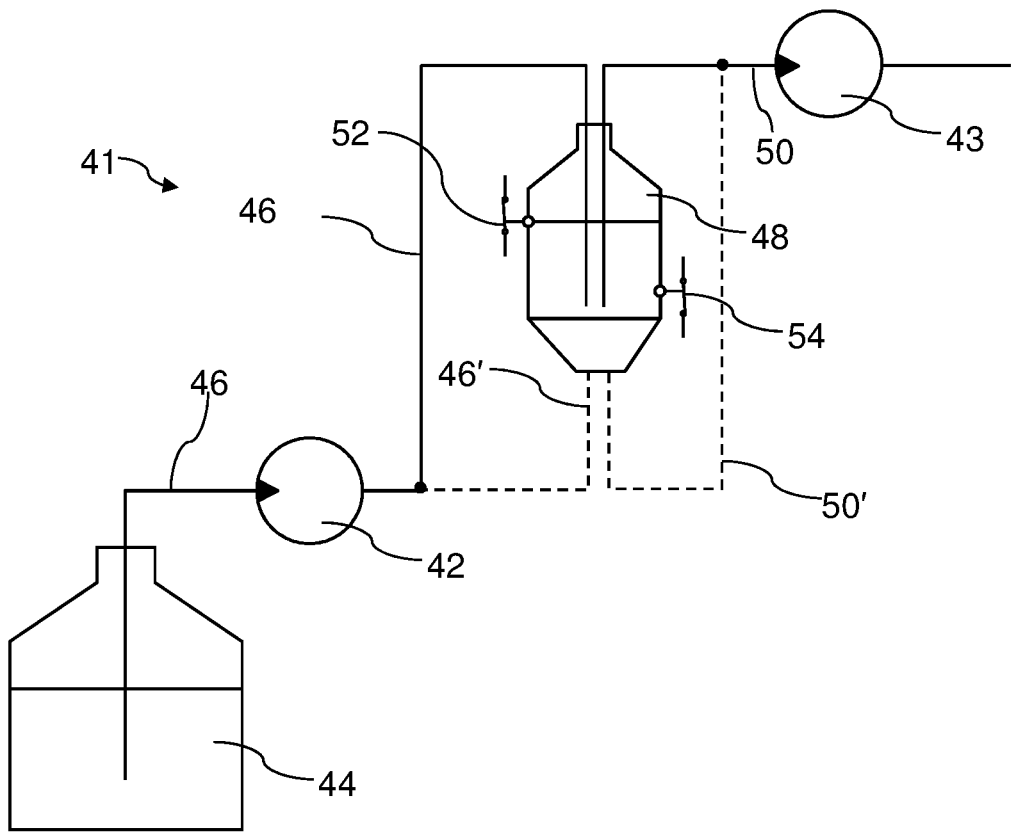
FIG. 2 is a block diagram of an arrangement for calibrating a delivery rate of an ink pump of the printing device.

FIG. 2 shows a block diagram of an arrangement 41 for calibrating a delivery rate of an ink pump 42 of the printing device 10. The ink pump 42 conveys ink from an ink reservoir 44 into an ink container 48 via an ink line 46. For example, the ink pump 42 is a hose pump, peristaltic pump, and/or gear pump, wherein the pumps respectively preferably have a brushless DC drive with a signal output for a tacho signal. This optional tacho signal may contain a plurality of pulses per revolution.

Via a print bar ink line 50, one of the print bars 18 through 24 is supplied with ink, or the ink is transported to one of the print bars 18 through 24, in order to then be printed onto the recording medium 12. The printing device 10 comprises at least four arrangements 41 that respectively supply a print bar 18 through 24 with ink. An arrangement 41 is thus provided for each of the base colors CMYK.

Furthermore, the primer print bar 16 may be supplied with a primer fluid with the aid of an additional arrangement 41. In this instance, instead of ink, the primer fluid is conveyed by the ink pump 42. If ink is discussed in the specification in the context of the arrangement 41, the term then encompasses the primer fluid.

Furthermore, the ink pump 42 comprises in particular a brushless direct current (BLDC) drive that may be controlled via the control unit 40 of the printing device 10 in order to pump ink. The control unit 40 may thereby determine the rotational drive speed of the drive of the ink pump with the aid of a rotation sensor (tachometer). The rotation sensor is, for example, a Hall sensor that determines multiple pulses per rotation of a drive shaft, and thus may determine a fraction of a rotation. Furthermore, the ink pump 42 may be controlled with a control voltage so that a magnetic field is established in the electrical pump drive and the ink pump 42 is already pre-stressed without moving the drive shaft. The pre-stressing overcomes the existing mechanical play in the pump in order to thus avoid additional inaccuracies. At a pump start, the control voltage is then accordingly suddenly increased, corresponding to a desired rotational speed, in order to bring the drive shaft up to the desired rotational speed. Via the pre-stressed pump drive, the drive shaft may be accelerated to its desired rotational speed with a starkly shortened acceleration phase. Fluctuations in the delivery efficiency upon starting up the ink pump 42 may thus be reduced.

The ink container 48 of the arrangement 10 comprises at least one sensor unit having a first signal transmitter 52 and a second signal transmitter 54. The sensor unit detects a fill level of the ink container 48. The first signal transmitter 52 detects a first fill level value if ink in the ink container 48 reaches at least said first signal transmitter 52. In FIG. 2, the ink container 48 is shown so filled with ink that the ink has reached the first signal transmitter 52, and thus a first fill level value has been determined. In accordance with this, the second signal transmitter 54 determines a second fill level value that is below the first fill level value.

The ink volume of the ink container 48 between the first and second fill level value is predetermined. This means that a predetermined volume is located between the first fill level value and the second fill level value. The ink container 48 is precisely manufactured, and the sensor unit is precisely arranged, so that the predetermined volume has a low production lot variation.

Alternatively, the sensor unit of the ink container 48 may comprise only one signal transmitter, which either determines only one fill level value or determines the continuous fill level value of an arbitrary fill level within a sensor range. For example, the sensor unit may be an ultrasonic sensor.

Figure 3:
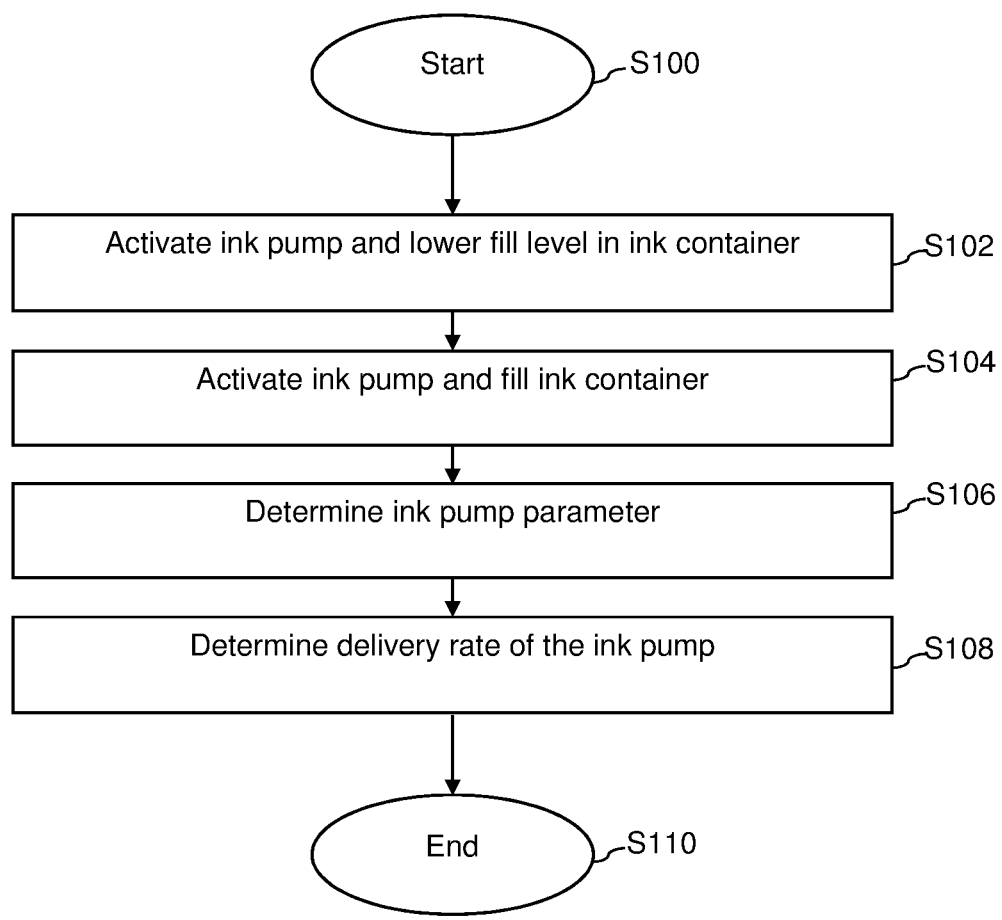
FIG. 3 is a workflow diagram for calibrating a delivery rate of the ink pump.

FIG. 3 shows a workflow diagram for calibrating a delivery rate of the ink pump 42. The method starts in step S100. In step S102, the ink pump 42, and/or the ink pump 43 arranged in line 50, activates in order to lower the fill level in the ink container 48 below the second fill level value, insofar as such is present. If the second signal transmitter 54 is not present or not in use, the ink container 48 may be entirely emptied. In this event, the ink infeed 46' and/or discharge 50' may preferably be arranged at the lowest point of the ink container 48 (see lines 46', 50' depicted in dashed lines). The ink pump 42 and/or 43 is thereby controlled by the control unit 40 so that ink is pumped from the ink container 48 into the ink reservoir 44. If the control unit 40 detects the second fill level value with the aid of the second signal transmitter 54, the ink pump 42 (and/or 43) is stopped after a predetermined time or after a predetermined number of rotations of the drive shaft. It is therewith ensured that the fill level after step S102 is safely below the second fill level value. In the event that the ink container 48 is already empty, for example given a new installation or given servicing, step S102 may be skipped.

In step S104, the ink pump 42 is controlled so that ink is pumped from the ink reservoir 44 into the ink container 48.

In step S106, an ink pump parameter upon pumping the ink into the ink container 48 and/or the reaching of the first fill level value is detected with the aid of the control unit 40. Given use of the second signal transmitter 54, the second (lower) fill level value is detected in advance of the first (higher) fill level value. The ink pump parameter is thereby, for example, a time or a number of rotations of the drive shaft of the ink pump 42. For example, the time or the number of rotations is thus determined that is required in order to fill the volume between the second fill level value and the first fill level value. This means that the ink pump parameter is determined during the filling of the predetermined volume. If the second signal transmitter remains unused or is not present, the second fill level value is zero.

After so much ink has been conveyed into the ink container 48 that the first fill level value is reached, the ink pump 42 is stopped after a predetermined time or after a predetermined number of rotations of the drive shaft. It is therewith ensured that the fill level after step S106 is safely above the first fill level value.

In step S108, a delivery rate of the ink pump 42 is determined with the aid of the control unit 40 based on the ink pump parameter and the predetermined volume, in particular by dividing the predetermined volume by the ink pump parameter. This determined delivery rate is thereby an actual delivery rate, in contrast to a nominal delivery rate that would be expected given nominal operating conditions. The determined delivery rate is thus, for example, a conveyed volume per rotations of the drive shaft of the pump. The rotations of the drive shaft may also be a fraction of a whole rotation of the drive shaft. The method ends in step S110.

Additionally, the time or the number of rotations of the drive shaft may be determined that pass between a determination of the first fill level value by the signal transmitter 52 and the stopping of the ink pump 42. This enables errors due to a coasting of the ink pump 42 to be reduced.

Figure 4:
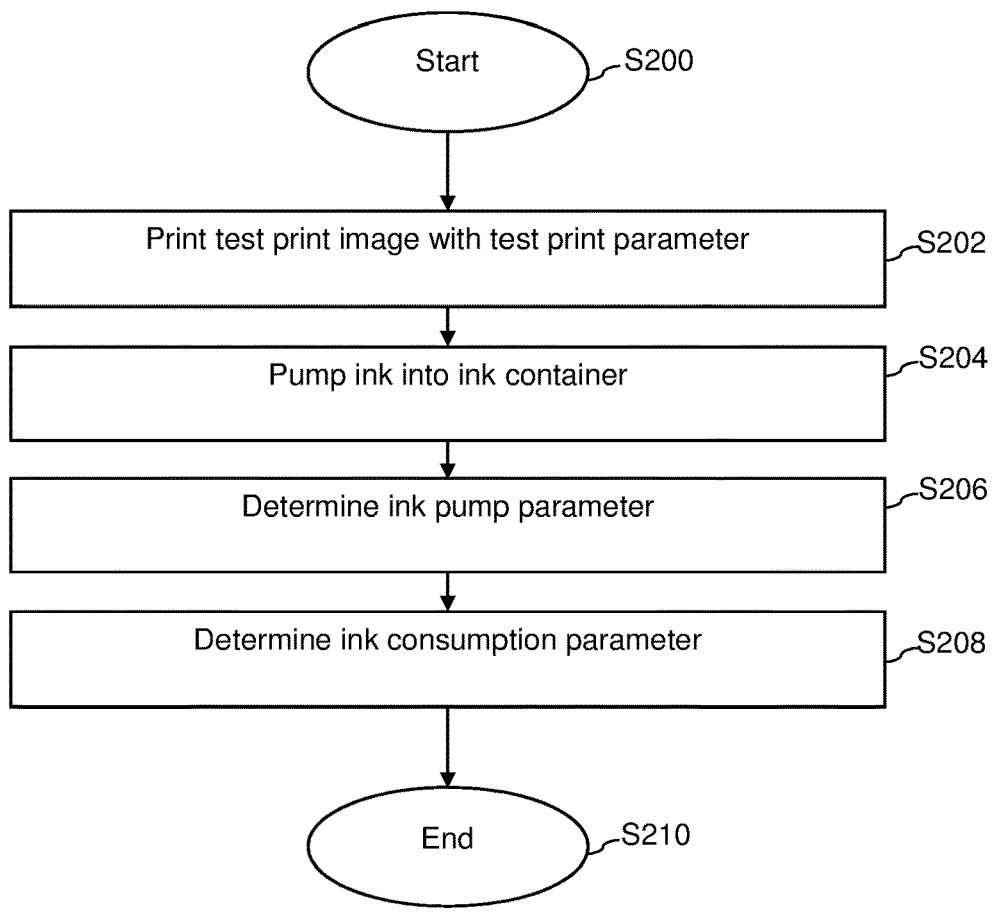
FIG. 4 is a workflow diagram for determining an ink consumption parameter of at least one print head of the printing device.

FIG. 4 shows a workflow diagram for determining an ink consumption parameter of at least one of the print heads 26 of the printing device 10. The method starts in step S200. In step S202, a test print image is printed onto the recording medium 12 with the aid of at least one of the print heads 26 of the printing device 10. The print bars 18 through 24 of the at least one print head 26 are thereby supplied with ink with the aid of the arrangement 41. The ink pump 42 of the arrangement 41 was calibrated before step S202 with the method according to FIG. 3, meaning that the actual delivery rate of the ink pump 42 was determined.

As an alternative to this, a nominal delivery rate of the ink pump 42 may be used. Furthermore, the ink container is filled with ink up to the first fill level value before step S202. The test print image comprises at least one test print region that is printed depending on a first test print parameter. The test print parameter is, for example, an inking intensity or an ink droplet size. The test print image with the test print region may thus be printed onto the recording medium 12, wherein the test print region is printed with, for example, a 50% inking intensity.

In a step S204, the ink consumed by the printing is replenished with the aid of the ink pump 42 so that the fill level of the ink container is kept at the first fill level value. This means that, if the fill level of the ink container 48 falls below the first fill level value, and falling below the first fill level value is determined by the sensor unit, the control unit then controls the ink pump 42 so that ink is pumped from the ink reservoir 44 into the ink container 48 until the first fill level value is reached.

In step S206, an ink pump parameter is determined. This ink pump parameter is determined during the entire printing of the test print image, in particular cumulatively for the pump processes that are required in step S204 in order to keep the fill level of the ink container 48 at the first fill level value. The ink pump parameter may thereby be the cumulative running time of the ink pump 42, or the number of rotations of the drive shaft during step S204. Furthermore, the time or the number of rotations of the drive shaft that pass between a determination of the first fill level value by the signal transmitter 52 and the stopping of the ink pump 42 may additionally be considered. This enables errors due to a coasting of the ink pump 42 to be reduced.

In step S208, an ink consumption parameter of at least the one print head 26 for the test print parameter is then detected based on the detected ink pump parameter and the delivery rate of the ink pump 42, in particular by multiplying the ink pump parameter by the delivery rate. The detected ink consumption parameter is thus the measured volumetric ink consumption upon printing the test print region, for example depending on a determined inking intensity. Furthermore, a plurality of test print regions that are respectively printed with a different test print parameter may be printed one after another. For example, a respective ink consumption parameter may thus be determined for a plurality of ink intensities or ink droplet sizes. In particular if the test print parameter is an ink droplet size, an average volume of an ink droplet specified in particular by the print data may be determined with the aid of the ink consumption parameter. The method ends in step S210.

The method according to FIG. 4 may in particular also be applied to the print bar 16, which prints primer fluid. If the test print image, in particular the test print region, is arranged so that only one print head 26 prints the test print region, it is possible to determine ink consumption parameters of a single one of the print heads of the print bar 16, for example for a 50% inking intensity. If only one print head 26 prints the test print region, the test print region is printed only in one column 38 on the recording medium 12. If ink consumption parameters should be determined for all of the print heads 26 of the print bar 16, a balancing between the print heads 26 may take place, and thus the average ink volume per print head 26 may be adapted in order to enable an optimally uniform ink application on the recording medium 12.

Figure 5:
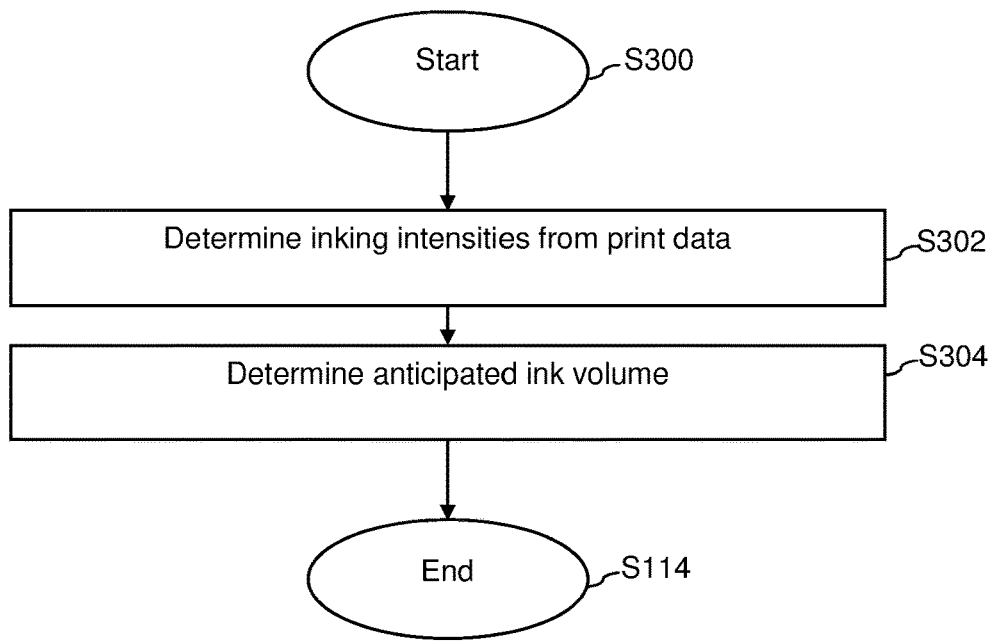
FIG. 5 is a workflow diagram for determining a print image to be printed based on print data.

FIG. 5 shows a workflow diagram for determining a print image to be printed based on print data. The method starts in step S300. In step S302, inking intensities for raster regions of the print image are determined from the print data. The inking intensities are thereby determined for each of the base colors of the printing device 10. These inking intensities are dependent on the area coverage of the dots to be printed on the recording medium 12 based on the print data. The individual raster regions of the print image together form the total print image.

In step S304, the anticipated ink volume that is necessary to print the print image is determined based on the determined inking intensities and ink consumption parameters. The ink consumption parameters are in particular to be determined with the method according to FIG. 4. The ink consumption parameters describe the necessary ink quantity in order to print to a region of the recording medium 12 with an inking intensity. The method ends in step S306. An exact prediction of the ink quantity required for printing a specific print image is possible via this method.

REFERENCE LIST 10 printing device
12 recording medium
16, 18,
20, 22,
24 print bar
26 print head 28 print image
34 print group
36 print nozzle
38 column
40 control unit
41 arrangement for calibrating a delivery rate of an ink pump
42 ink pump
44 ink reservoir
46 ink line
48 ink container
50 print bar ink line
52 first signal transmitter
54 second signal transmitter
T1 transport direction

The invention claimed is:

1. A method for calibrating a delivery rate of an ink pump of a printing device with the aid of an ink container comprising a sensor unit to detect at least one first fill level value, the method comprising:
    based on an initial fill level of the ink container below the first fill level value, convey with the ink pump ink from an ink reservoir into the ink container up to a final fill level above the first fill level value, so that at least a predetermined volume between the initial fill level and the first fill level value is filled;
    upon conveying the ink into the ink container, detecting an ink pump parameter upon reaching the first fill level value; and
    determining the delivery rate of the ink pump based on the predetermined volume and the ink pump parameter.

2. The method according to claim 1, wherein the ink container is empty at the initial fill level.

3. The method according to claim 1, wherein the sensor unit detects a second fill level value, and the initial fill level corresponds to the second fill level value.

4. The method according to claim 1, wherein the ink pump parameter is a time or a rotation.

5. The method according to claim 1, wherein the delivery rate is a volume per time or a volume per rotation/pulse.

6. The method according to claim 1, wherein the initial fill level of the ink container is achieved in that ink is pumped from the ink container with the aid of the ink pump or an additional pump unit.

7. The method according to claim 1, wherein the ink pump is controlled with a control voltage so that a pump rotor at rest is pre-stressed, and the pump motor achieves its desired rotation speed as quickly as possible given a sudden increase of the control voltage corresponding to a desired rotation speed of the pump rotor, and ink is thereby pumped at a constant delivery rate with the aid of the ink pump.

8. A method for determining an ink consumption parameter of at least one print head of a printing device, the method comprising:
    supplying the at least one print head with ink from an ink container having at least one sensor unit to detect at least one first fill level value;
    printing a test print image onto a recording medium with the print head, which test print image has at least one print image region that is dependent on a predetermined test print parameter;
    before beginning the printing of the test print image, filling the ink container with ink up to the first fill level value;
    upon printing the test print image, transporting ink from the ink container to the print head so that a fill level of the ink container falls to a consumed fill level below the first fill level value;
    pumping ink from an ink reservoir into the ink container with the aid of an ink pump in order to fill the ink container up from the consumed fill level to the first fill level value, wherein, upon conveying the ink into the ink container, an ink pump parameter is determined until the first fill level value is reached, and
    detecting an ink consumption parameter for the predetermined test print parameter based on the ink pump parameter and a delivery rate of the ink pump.

9. The method according to claim 8, wherein the test print parameter is either a number of ink droplets of a predetermined size or a predetermined inking intensity.

10. The method according to claim 8, wherein the ink consumption parameter is a volume corresponding to an ink volume consumed for printing of the test image.

11. The method according to claim 8, wherein a printing region comprises the entire printable width of the recording medium, or
    wherein the printing region comprises a portion of the printable width of the recording medium.

12. The method according to claim 11, wherein the printing region comprises a printable width that is associated with a single print head.

13. The method according to claim 8, wherein the test print image comprises a plurality of print image regions that are respectively dependent on the predetermined test print parameter.

14. A method for determining an anticipated ink consumption for a print image to be printed based on print data, the method comprising:
    determining respective inking intensities for base colors from the print data for raster regions of the print image; and
    determining the anticipated ink consumption for the print image to be printed with the ink consumption parameters detected in accordance with the method of claim 8, and based on the inking intensities.

15. An arrangement for calibrating a delivery rate of an ink pump of a printing device with the aid of an ink container comprising a sensor unit to detect at least a first fill level value, the arrangement comprising:
    an ink reservoir;
    the ink container in fluid communication with the ink reservoir via the ink pump; and
        a control unit operatively connected to the ink pump and the sensor unit, the control unit configured to: to control the ink pump, based on an initial fill level of the ink container below the first fill level value, to convey ink from the ink reservoir into the ink container up to at least a first fill level value, so that at least a predetermined volume between the initial fill level and the first fill level value is filled,
    upon conveying the ink into the ink container, to detect an ink pump parameter upon reaching the first fill level value, and
    to determine a delivery rate of the ink pump based on the predetermined volume and the ink pump parameter.

16. The arrangement according to claim 15, wherein the ink container is empty at the initial fill level.

17. The arrangement according to claim 15, wherein the sensor unit detects a second fill level value, and the initial fill level corresponds to the second fill level value.

18. The arrangement according to claim 15, wherein the ink pump parameter is a time or a rotation.

19. The arrangement according to claim 15, wherein the delivery rate is a volume per time or a volume per rotation/pulse.

20. The arrangement according to claim 15, wherein the initial fill level of the ink container is achieved in that ink is pumped from the ink container with the aid of the ink pump or an additional pump unit.

* * * * *